Patented Apr. 15, 1941

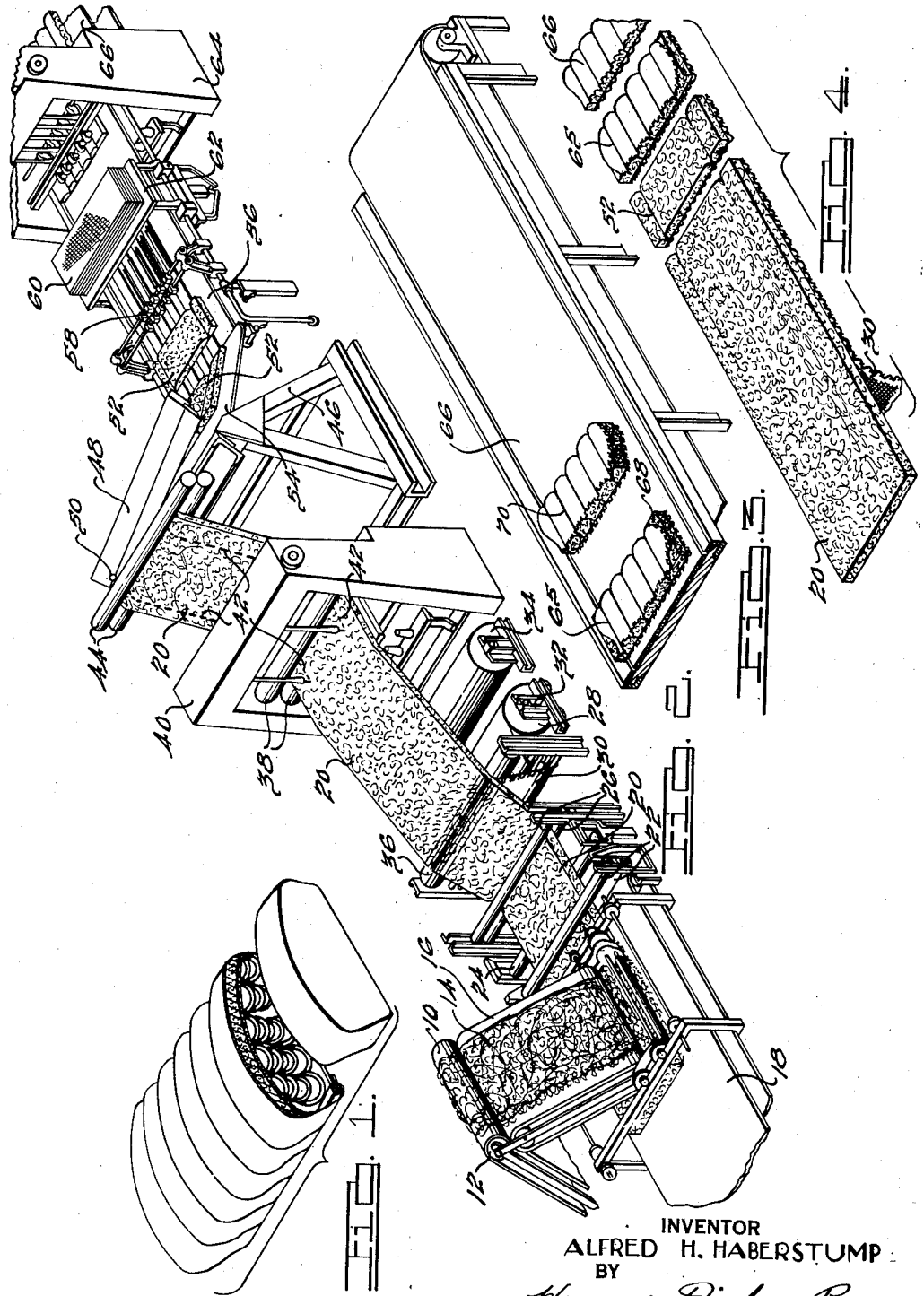

2,238,773

UNITED STATES PATENT OFFICE 2,238,773

APPARATUS FOR AND METHOD OF FORMING CUSHION CONSTRUCTIONS

Alfred H. Haberstump, Detroit, Mich., assignor to The Murray Corporation of America, Detroit, Mich., a corporation of Delaware Application December 10, 1937, Serial No. 179,075

3 Claims. (Cl. 112—2)

The present invention relates to an apparatus for and method of forming upholstery articles; and particularly relates to an apparatus for and method of combining a backing element, a pad, and trim material to form upholstery articles.

One of the primary objects of the present invention is to provide an improved and simplified apparatus for and method of fabricating upholstery articles in which padding is disposed on a backing element and fixed thereto, then sectioned, and then the finish material disposed on and stitched to the section.

Another object of the invention is to provide a structure whereby a continuous fibrous pad is stitched to a continuous backing element and thereafter severed into sections.

A further object of the invention is to provide a structure in which a continuous strip of padding, which has been stitched to the backing material, is continuously fed to a severing mechanism located adjacent the top of an inclined conveyer or chute whereby the severed sections immediately drop by gravity away from the severing means.

Other objects of the invention will become apparent from the following specification, the drawing relating thereto, and from the claims hereinafter set forth.

In the drawing in which like numerals are used to designate like parts in the several views throughout:

Figure 1 is a broken perspective view of a seat cushion representing one type of article to which the present invention applies;

Fig. 2 is a fragmentary diagrammatic perspective view of the major portion of a machine according to the present invention;

Fig. 3 is a fragmentary perspective view of the conveyer mechanism which is at the discharge end and completes the apparatus illustrated in Fig. 2; and Fig. 4 is a diagrammatic perspective view illustrating the article in its various stages of manufacture.

Referring to the drawing a garnetting machine, such as that illustrated in the copending application of Clarence W. Avery, Serial No. 58,859, filed January 13, 1936, is partially illustrated having an upwardly directed discharge conveyer 10. It is to be understood that a suitable supply of non-woven fibrous material is fed into the garnetting machine within which the cutters and combs serve to tear up the fibers and distribute them at random substantially in a uniform non-woven layer to the endless conveyer belt 10, which operates upon the usual end pulleys or rollers 12. This web of padding material indicated at 14 is discharged onto a downwardly directed conveyer belt 16 which oscillates transversely above an endless conveyer belt 18. The conveyer belt 16 is mounted for oscillation in the manner described in the Avery copending application referred to. As the lower end of the conveyer 16 reciprocates above the conveyer 18, the layer of non-woven padding material is distributed substantially uniformly on the conveyer 18 to form a continuous bat 20 of fibrous material. The conveyer 18 is supported at its ends on the usual rollers which are in turn supported by the usual frame work. The means for driving the rollers are not illustrated, but it is to be understood that suitable means may be used for continuously driving the conveyer at desired speeds.

The formed bat 20 is discharged from the conveyer 18 and passes through a pair of suitably driven compression rollers 22, over a guide roller 24, and between other suitably driven compression rollers 26. These rollers may also be suitably supported and driven; and the compression rollers are suitably adjustably mounted so that they may be adjusted toward each other to define passes therebetween of desired thickness.

A reel 28 of burlap 30, or other suitable backing material, is positioned beneath the path of the bat 20, and is suitably supported on a frame 32. Another similar reel 34 having burlap thereon is preferably positioned adjacent the first reel so that the burlap on the reel 34 may be attached to the end of the burlap on the reel 28 so that a continuous ribbon of backing material is supplied to the machine. The backing material 30 is passed over an idle roller 36 and forms a conveyer support for the continuous bat 20.

The strip of burlap 36 having the bat 20 superimposed thereon is then fed through a pair of suitably driven rollers 38 which are mounted on a stitching or sewing machine generally indicated at 40. The sewing machine per se may be of conventional construction; and stitches the bat 20 to the backing strip 36 along longitudinally extending stitch lines 42 to form a composite strip. As the stitched bat and backing material leave the rollers 38 of the stitching machine 40 they are passed upwardly between a pair of suitably driven rollers 44, which are suitably mounted above a frame 46. The frame supports a severing element, such as a transversely extending knife 48, which is pivotally mounted at one end by a pivot 50 to the frame 46. The knife 48 may be periodically and automatically operated by suitable mechanical means, or it may be hand operated to sever the continuous strip of padding and backing material into sections 52 of desired size. The bat and backing material are supported upon a downwardly inclined table conveyer or chute 54 as they pass under the severing means 48; and simultaneously with the severing the severed section 52 drops by gravity down the table conveyer 54. Instead of the chute conveyer 54, a mechanical conveyer may be used, such as one having endless belts with upwardly directed pins which project into the sections and carry them downwardly to the bottom of the conveyer.

A substantially horizontal conveyer 56 is disposed adjacent the lower end of the table conveyer 54 and carries the severed sections under the remaining elements of the machine to complete the article. The remaining elements of the machine are substantially the same in function and arrangement as the corresponding elements illustrated in the copending application of Alfred H. Haberstump, Serial No. 155,281, filed July 23, 1937.

The conveyer 56 intermittently operates to pass the severed section 52 under a gathering device 58, which is illustrated in lowered position. Sheets of top material 60 of proper dimensions are disposed on a table 62, from which they are taken one at a time and placed on channel-like elements of the gathering device 58. The details of the gathering device 58 and the conveyer 56 with the intermittent means for the conveyer 56 are illustrated in detail in the Haberstump application above referred to. The arms of the gathering device 58 cooperate with the channel element to gather the material along the lines to be sewn. After the material has been gathered in this manner, the pad and trim materials are advanced by the conveyer 56 to a position above continuously actuated conveyer chains having projecting pins which pierce the backing sheet and pad when the conveyer 56 is lowered to dispose the assembled unit upon the conveyer chain. The details of the conveyer chains and their operation are also disclosed in detail in the Haberstump application referred to. The conveyer chains referred to are continuously driven so that the assembled units are disposed in position in a sewing machine 64. The stitching of the pad by the machine 64 occurs along the lines on which the gathering of the trim material occurs.

The article after having the trim material stitched thereto is illustrated at 65 and is discharged from the sewing machine on to a continuously driven conveyer belt 66. The exposed corners 68 of the article 65 are thereafter trimmed to provide the finished article 70.

The driving means for the various rolls and elements of the machine are not illustrated in detail as those skilled in the art will readily understand how such drive means may be applied. It is preferable that a single drive means be used for the sewing machine 64, and the various rollers and conveyers be driven in synchronism with the machine so that the various steps in the method may be accomplished in timed sequence.

From the above it is evident that the method of constructing the pads is continuous and embodies the feeding of a continuous sheet of backing material to the under side of the continuously moving bat of fibrous material. The continuous bat of fibrous material is superimposed upon the continuous strip of backing material and is then continuously fed through a stitching machine and continuously conveyed to a severing means where the continuous strip is severed into sections. The sections then drop by gravity to an intermittently operated conveyer which pass the sections intermittently to a gathering device where sheets of covering material are placed thereon and gathered along the line to be sewn. The sections at this stage are then deposited upon a continuously operating conveyer which continuously advances the article through the sewing machine.

Formal changes may be made in the specific embodiment of the invention described without departing from the spirit and substance of the invention, the scope of which is commensurate with the appended claims.

What is claimed is:

1. In the method of preparing upholstery, the steps which comprise continuously applying a substantially uniform layer of padding material to a strip of backing material to form a composite strip, continuously moving the composite strip through a stitching machine, stitching the padding material and the backing material together, thereafter severing the composite strip into sections, applying a cover material to each of the sections, and sewing the padding material, backing material, and cover material together along predetermined lines.

2. In the method of preparing upholstery, the steps which comprise continuously applying a substantially uniform layer of padding material to a strip of backing material to form a composite strip, continuously moving the composite strip through a stitching machine, continuously stitching the padding material and the backing material together along longitudinally extending lines, thereafter severing the composite strip into sections, applying a cover material to each of said sections, intermittently moving said sections through a means forming fullness in the cover material, continuously moving the composite strip with the cover thereon through a sewing machine, and sewing the section and material along predetermined lines.

3. A pad forming device including, in combination, means for continuously feeding a strip of backing material, means for continuously depositing a bat of fibrous material on said strip as said strip is advanced, means for stitching said bat and said strip together along longitudinally extending lines to form a composite strip, means for positioning said composite strip above said stitching means, a downwardly inclined conveyor located adjacent said last named means, severing means disposed adjacent the top of said conveyor to cut said composite strip into sections, means for gathering fullness in a cover material disposed on each of said sections, and means for stitching said sections and said material together.

ALFRED H. HABERSTUMP.